Jan. 17, 1961
M. BAERMANN
2,968,755
MAGNETIC MOTOR
Filed July 28, 1958
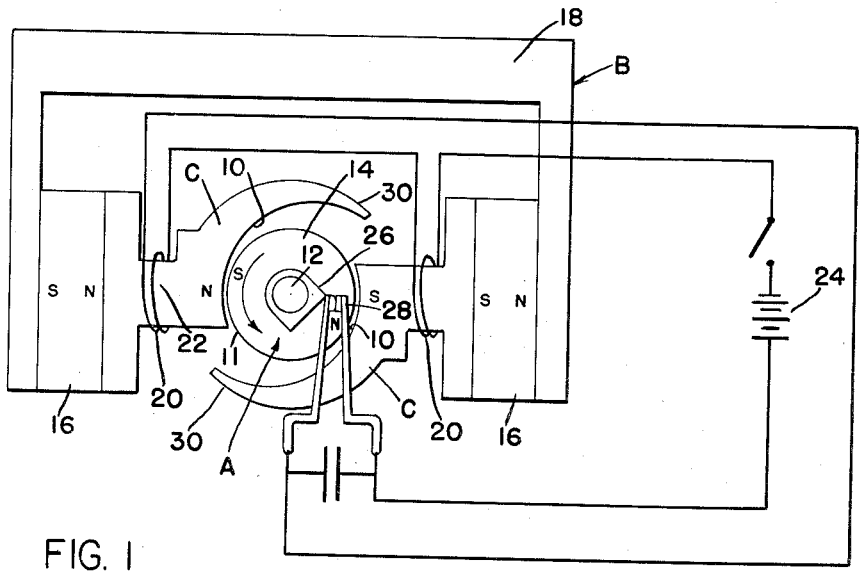
FIG. 1
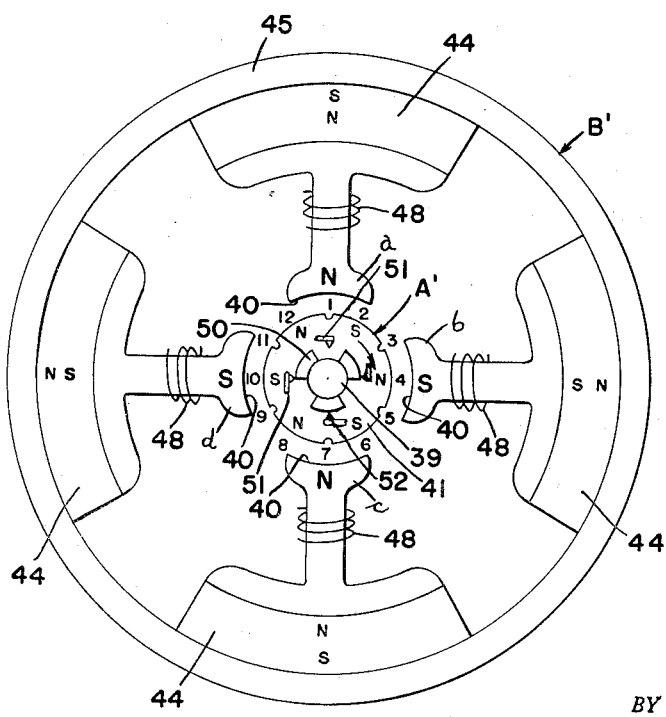
FIG. 2
| POSITION | a | b | c | d |
|---|---|---|---|---|
| 0 | N | S | N | S |
| 1 | Ⓢ | Ⓝ | N | S |
| 2 | N | Ⓝ | Ⓢ | S |
| 3 | N | S | Ⓢ | Ⓝ |
| 4 | Ⓢ | S | N | Ⓝ |
| 5 | Ⓢ | Ⓝ | N | S |
| 6 | N | Ⓝ | Ⓢ | S |
| 7 | N | S | Ⓢ | Ⓝ |
| 8 | Ⓢ | S | N | Ⓝ |
| 9 | Ⓢ | Ⓝ | N | S |
| 10 | N | Ⓝ | Ⓢ | S |
| 11 | N | S | Ⓢ | Ⓝ |
| 12 | Ⓢ | S | N | Ⓝ |
| 1 | Ⓢ | Ⓝ | N | S |
FIG. 3
INVENTOR.
MAX BAERMANN
BY
*Alfred C. Body*
ATTORNEY

United States Patent Office 2,968,755
Patented Jan. 17, 1961

2,968,755

MAGNETIC MOTOR

Max Baermann, Bensberg Wulfshof, Koln (Rhine), Germany

Filed July 28, 1958, Ser. No. 751,313

4 Claims. (Cl. 318—254)

This invention pertains to the art of motors, and more particularly to a magnetic motor wherein the rotor has permanently magnetized poles.

The invention is particularly applicable to high speed electrically energized motors having a rotor with permanently magnetized poles, and will be described with particular reference thereto, although it will be appreciated that the invention has broader applications.

It is known to provide electric motors having a rotor with permanent magnetic poles, in which case the stator consisted of electrically energized field poles, the current for which was supplied either from a source of alternating current or from commutators rotating with the rotor. In all such instances, the maximum speed of the motor was limited by the frequency of the alternating current or by the ability of the commutator to rapidly reverse the flow of current in the field coil. Furthermore, it was difficult to synchronize the speed of such a motor with remotely located equipment.

The present invention contemplates a magnetic motor of the general type described which overcomes all of the above-referred to difficulties, and others, and provides such a magnetic motor which may be energized by a direct current without the need for a commutator.

In accordance with the present invention, a magnetically operated motor is provided comprised of a rotor member having at least a pair of circumferentially spaced, oppositely polarized, permanent magnetic poles and a stator having at least a pair of circumferentially spaced magnetic poles arranged to consecutively face the rotor poles as they rotate, the stator including permanent magnetic means for magnetizing adjacent stator poles with opposite magnetic polarity and remotely actuated magnetic means of a greater magnetic strength than the permanent magnetic means for reversing the magnetic polarity of the stator poles when actuated and means for actuating such magnetic means in synchronism with the rotation of the rotor.

The principal object of the invention is the provision of a new and improved magnetic motor which is simple in construction, efficient in operation and economically manufactured.

Another object of the invention is the provision of a new and improved magnetic motor which may be energized by a direct current power source.

Another object of the invention is the provision of a new and improved direct current energized electric motor which does not require a commutator.

Another object of the invention is the provision of a new and improved magnetic motor, the rotational speed of which may be remotely controlled in a simple and efficient manner.

Another object of the invention is the provision of a new and improved permanent magnetic motor which may be operated in synchronism with remote rotating apparatus.

Another object of the invention is the provision of a new and improved motor of the general type described, the speed of which may be readily controlled by simple electrical control means remote from the motor.

Another object of the invention is the provision of a new and improved electric motor which may operate in synchronism with other rotating apparatus at any desired rotational speed.

Another object of the invention is the provision of a new and improved electric motor which is readily adapted for high rotational speeds.

The invention may take physical form in certain parts and arrangements of parts, the preferred embodiments of which will be described in sufficient detail to enable one to utilize the invention. In the specification and the drawings, which are a part hereof, and wherein:

Figure 1 is a somewhat schematic end view of a two pole motor illustrating a preferred embodiment of the invention;

Figure 2 is a similar view of a multi-polar motor illustrating an alternative embodiment of the invention, and Figure 3 is a chart showing the energization of the intermittently operated field coil for proper operation.

Referring now to the drawings wherein the showings are for the purposes of illustrating preferred embodiments of the invention only, and not for the purposes of limiting same, Figure 1 shows a motor comprised of a rotor A and a stator B forming a magnetic circuit terminating in a pair of field poles C, each having a field pole surface 10 facing in close spaced relationship the outer surface 11 of the rotor A.

The rotor A is supported for rotation on a shaft 12 in turn mounted in suitable bearings, not shown. The rotor A in the preferred embodiment includes an armature 14 having a pair of circumferentially spaced, oppositely polarized, magnetic poles indicated by the letters N and S. In the preferred embodiment these pole faces face radially outwardly and the armature 14 may be considered as having a radial axis of polarization. Obviously more than the two poles can be provided with adjacent poles having opposite magnetic polarity.

These poles on the rotor A may be provided by any suitable means, such as by electrically energized coils, but in the preferred embodiment, the armature 14 is formed of a permanent magnetic material mixed with a suitable binder material and molded to the cylindrical shape shown. The permanent magnetic polarity may be induced either during the molding of the armature or after the molding.

The magnetic circuit of the stator B includes first magnetic means for permanently magnetizing each field pole C with a "normal" magnetic polarity, adjacent poles having opposite polarity. Such means may include a conventional coil energized from a suitable source of direct current, or, and in accordance with the preferred embodiment, a pair of permanent magnets 16 each having spaced magnetic poles indicated by the letters N and S, the magnetic polarity being such that the flux of one magnet is added to the flux of the other magnet, and as shown, the S pole of the left hand magnet 16 is magnetically coupled to the N pole of the right hand magnet 16 by means of a flux bridge 18 of magnetically permeable material. Such bridge is shown as being in the shape of a U, but it will be appreciated that it may either be semi-circular or circular, or rectangular, the exact construction or shape forming no part of the present invention.

It will be noted that the magnets 16 magnetically polarize each field pole C with a "normal" but opposite magnetic polarity.

The magnets 16 are preferably of a magnetic material having a high degree of permanence even when subjected to the strong demagnetizing forces of the present invention. They also preferably have a low magnetic permeability, e.g., a μ of not more than 50 and preferably close to one. Barium ferrite is preferred.

Second magnetic means are also provided for reversing the "normal" magnetic polarity of the poles C. This is done by providing magnetic means having a magnetic strength greater than the magnetic strength of the magnets 16. Such means may take a number of different forms, for example, permanent magnets movable relative to the field poles C, but more preferably, and in accordance with the preferred embodiment, by means of a pair of electric coils 20 wound around a part of the magnetic circuit, which in the embodiment shown, is the part of the magnetic circuit 22 positioned between the magnets 16 and the field pole C. The coils 20, when energized from a suitable source of direct current such as the battery 24, create a magnetic force greater than the magnetic force of the magnets 16, and in opposition thereto, such that the normal magnetic polarity of the field poles C will be reversed from that indicated on the drawing. The strength of the magnetic field created by the coils 20 will be determined by the number of turns and the current flowing through the coils when energized. As the determination of the number of turns and the current flowing therethrough is well within the capabilities of one skilled in the art, it will not be detailed here further.

Obviously when the armature and field poles are of the same magnetic polarity, they will repel each other, and when of opposite magnetic polarity, they will attract.

Further in accordance with the invention, means are provided for intermittently energizing the coils 20 to reverse the "normal" polarity of the field poles C so that these repelling and attracting forces cause rotation of the rotor A. This energizing must occur in phase or synchronism with the rotation of the rotor A.

Such means may take any one of a number of different forms, either remote from the motor or directly associated therewith. In the embodiment of the invention shown, a shaft 12 has a cam 26 fixed thereto which engages and closes a normally open electrical switch 28 in series with the battery 24 and the coils 20. The rise of the cam and the switch are so located relative to the magnetic poles of the armature 14, as to de-energize and energize the coils 20 at the proper moment in the arc of rotation of the rotor poles.

Obviously by remotely controlling the energization of the coils 20 rather than by using the switch 28, the speed of rotation of the rotor A may be readily remotely controlled. Thus the rotor A will lock in synchronism or in phase with the switching means which energizes the coils 20. It will thus be appreciated that electronic switches such as thyratrons, transistors, or the like, may be considered as the equivalent of the switch 28, and may be used if desired. Such thyratrons, transistors, or the like, may draw their control voltage either from the rotor A or from external means such as other rotating apparatus with which the rotor A is to be synchronized in its rotation. In any event, the coils are always energized or de-energized in synchronism with the rotation of the armature. By varying the phase, the speed may be adjusted.

It will also be appreciated that with such an arrangement, ratios of rotational speeds other than one, either more or less, may be obtained.

It will further be appreciated that by properly operating the switch means, such extremely slow speeds of rotation may be obtained that the motor of the invention may be used as a step counting device.

In the embodiment of the invention shown in Figure 1, the field poles C each have a surface 10 which diverges slightly from the surface of the armature 14 in a direction against the direction of rotation and the radial width of the field pole becomes radially thinner in this same direction. By such an arrangement, the motor becomes self starting and a greater torque may be obtained.

It will thus be noted that the field poles C have an extension 30 extending circumferentially toward, but spaced from, the opposite pole, tapering in radial thickness, and with a surface 10 diverging away from the surface of the armature 14.

Figure 2 shows an alternative embodiment of the invention of the multi-polar type. Thus the rotor A' includes a shaft 39 rotatably supported in suitable bearings not shown, and an armature 41, preferably of permanent magnetic material magnetized to provide a plurality of, in this case, six radially outward facing permanent magnetic poles indicated by the letters N and S.

The stator B' includes a magnetic circuit including a plurality of field poles a, b, c, d, each having a surface 40 facing the outer surface of the armature 41 with adjacent field poles having an opposite magnetic polarization. In the embodiment shown, there are four field poles. Obviously, any number can be provided. Each field pole has a normal magnetic polarization indicated by the letters N and S, and such normal magnetization is maintained by suitable magnetic means such as the permanent magnets 44, each positioned between the field poles and an outer ring 45 of magnetically permeable materials which completes the magnetic circuit. For the purpose of reversing the magnetic polarity of the field poles, a coil 48 is provided wound about a portion of the field pole between the magnet 44 and the face 40. These coils 48 may be energized from suitable sources of direct current not shown.

The timing of the energization of the coils 48 may, as in accordance with the preferred embodiment, be in any desired manner, either remote from the motor or attached thereto. In the embodiments shown, the shaft 39 has a plurality of cams 50, one cam for each pair of magnetic poles on the armature 41. These cams 50 are arranged to actuate a switch for controlling the energization of the coils 48. In the embodiment of the invention shown, only the actuating arms 51 are shown, each arm having a dog 52 arranged thereon to actuate the arm 51 at the proper moment to energize the coils 48 and reverse the polarity of the field poles.

Figure 3 is a chart showing the desired polarity for each of the field poles a, b, c, d for twelve different positions of the rotor A'. In this chart, the letters N and S, where encircled, indicate that the coil 48 for the particular field pole, is energized to reverse its "normal" magnetic polarity.

It will be appreciated that the motor of Figure 2 will have a much more constant output torque than will the motor of Figure 1.

The motor described is capable of either very high or very low rotational speeds which speeds may be very accurately controlled either in synchronism with other rotating apparatus, or other frequency sources so that if desired, the rotational speed may be kept constant or varied, as desired.

The invention has been described with reference to preferred embodiments and in such detail as will enable one skilled in the art to readily construct motors embodying the principles of the invention.

Obviously modifications and alterations will occur to others upon a reading and understanding of this specification, and it is my intention to include all such modifications and alterations insofar as they come within the scope of the appended claims.

Having thus described by invention, I claim:

1. A magnetic motor comprising a rotary armature having at least a pair of oppositely polarized magnetic poles which face directly outward from the periphery of the armature and are polarized in the respective directions in which they face, and a stator comprising a magnetically permeable flux bridge, first magnetic means at opposite ends of said flux bridge producing opposite polarity magnet poles thereat, pole pieces respectively disposed completely between said last-mentioned opposite polarity poles and the periphery of the armature, said pole pieces extending into close proximity to the periphery of the armature at spaced locations therearound, said pole pieces normally assuming the respective polarities of said last-mentioned poles, and second magnetic means coupled to said pole pieces and operable when energized to reverse the respective magnetic polarities of the pole pieces.

2. A magnetic motor comprising a rotary armature having at least a pair of oppositely polarized magnetic poles which face directly outward from the periphery of the armature and are polarized in the respective directions in which they face, and a stator comprising a pair of permanent magnets, a magnetically permeable flux bridge between a pole of one of said magnets and the opposite polarity pole of the other magnet, pole pieces respectively disposed completely between the remaining poles of said magnets and the periphery of the armature, said pole pieces extending into close proximity to the periphery of said armature at spaced locations therearound, said pole pieces normally assuming the respective polarities of said remaining poles of said magnets, and electrically energizable windings inductively coupled to said pole pieces and operable when energized to reverse the respective magnetic polarities of the pole pieces.

3. The motor of claim 2 wherein said magnetic poles on the armature are permanent magnet poles which are polarized radially of the armature.

4. The motor of claim 2 wherein there is provided a D.C. power supply for said windings, a normally open switch connected between said D.C. power supply and said windings, and means driven by said armature for closing said switch in synchronism with the rotation of said armature.

References Cited in the file of this patent

UNITED STATES PATENTS

| | | |
|---|---|---|
| 2,482,875 | Sawyer | Sept. 27, 1949 |
| 2,864,018 | Aeschmann | Dec. 9, 1958 |